(12) United States Patent
Horstman et al.

(10) Patent No.: US 10,781,835 B2
(45) Date of Patent: Sep. 22, 2020

(54) MECHANICALLY DETACHABLE MEMBRANE FOR PRE-APPLIED WATERPROOFING

(71) Applicant: Tremco Incorporated, Beachwood, OH (US)

(72) Inventors: Eric K. Horstman, Cleveland, OH (US); Casey Sovey, Kirtland, OH (US)

(73) Assignee: TREMCO INCORPORATED, Beachwood, OH (US)

(*) Notice: Subject to any disclaimer, the term of this patent is extended or adjusted under 35 U.S.C. 154(b) by 1217 days.

(21) Appl. No.: 15/080,743

(22) Filed: Mar. 25, 2016

(65) Prior Publication Data

US 2016/0290375 A1    Oct. 6, 2016

Related U.S. Application Data

(60) Provisional application No. 62/140,528, filed on Mar. 31, 2015.

(51) Int. Cl.
*F16B 5/06* (2006.01)
*E02D 1/00* (2006.01)

(52) U.S. Cl.
CPC .............. *F16B 5/0692* (2013.01); *E02D 1/00* (2013.01)

(58) Field of Classification Search
CPC ......... E04D 5/143; E04D 5/145; E04D 5/147; E04B 1/665
See application file for complete search history.

(56) References Cited

U.S. PATENT DOCUMENTS

| | | |
|---|---|---|
| 1,462,934 A | 1/1913 | Fluor |
| 2,136,390 A | 11/1938 | McHugh |
| 3,378,974 A | 4/1968 | Bush, Jr. |
| 3,426,412 A | 2/1969 | Streng et al. |
| 3,793,795 A | 2/1974 | Annand |
| 3,844,527 A | 10/1974 | Scott |
| 4,221,028 A | 9/1980 | Fischer |
| 4,378,616 A | 4/1983 | Fischer et al. |
| 4,502,256 A | 3/1985 | Hahn |
| 4,520,606 A | 6/1985 | Francovitch |
| 4,532,744 A | 8/1985 | Beneze et al. |
| 4,534,145 A | 8/1985 | Yang et al. |
| 4,543,758 A | 10/1985 | Lane |
| 4,586,301 A | 5/1986 | Hickman |
| 4,617,771 A | 10/1986 | Tomaszewski |
| 4,624,092 A | 11/1986 | Baginski |

(Continued)

FOREIGN PATENT DOCUMENTS

JP    2013133612 A    7/2013

*Primary Examiner* — Daniel J Wiley
(74) *Attorney, Agent, or Firm* — Calfee, Halter & Griswold LLP

(57) ABSTRACT

In a method of attaching a membrane to a composite structure, a base portion of a fastener is affixed to a membrane such that a body portion of the fastener extends from a rear surface of the membrane. The body portion of the fastener is assembled with a retaining structure to secure the rear surface of the membrane against an exterior surface of the retaining structure. A curable composite is deposited against a front surface of the membrane, with the curable composite curing to form a composite structure attached to the front surface of the membrane. A detachment mechanism is operated to separate the body portion of the fastener from the base portion of the fastener, thereby detaching the membrane from the retaining structure.

18 Claims, 12 Drawing Sheets

(56) References Cited

U.S. PATENT DOCUMENTS

| | | |
|---|---|---|
| 4,631,887 A | 12/1986 | Francovitch |
| 4,638,532 A | 1/1987 | Yang et al. |
| 4,651,490 A | 3/1987 | Marston |
| 4,658,558 A | 4/1987 | Verble |
| 4,727,699 A | 3/1988 | Sargent |
| 4,757,662 A | 7/1988 | Gasser |
| 4,777,775 A | 10/1988 | Verble |
| 4,822,658 A | 4/1989 | Pacione |
| 4,825,614 A | 5/1989 | Bennett et al. |
| 4,833,853 A | 5/1989 | Deibele et al. |
| 4,841,706 A | 7/1989 | Resan |
| 4,854,105 A | 8/1989 | Delisle |
| 4,858,412 A | 8/1989 | Kassem |
| 4,949,523 A | 8/1990 | Kassem |
| 4,970,842 A | 11/1990 | Kappler et al. |
| 4,977,720 A | 12/1990 | Kuipers |
| 4,994,328 A | 2/1991 | Cogliano |
| 4,999,963 A | 3/1991 | Verble |
| 5,032,197 A | 7/1991 | Trimble |
| 5,094,056 A | 3/1992 | Peters |
| 5,182,890 A | 2/1993 | Peters |
| 5,361,848 A | 5/1994 | Bartlett et al. |
| 5,479,755 A | 1/1996 | Pacione |
| 5,496,615 A | 3/1996 | Bartlett et al. |
| 5,752,357 A | 5/1998 | Piller |
| 6,338,232 B1 | 1/2002 | Yamanaka et al. |
| 6,500,520 B1 | 12/2002 | Wiercinski et al. |
| 6,640,511 B1 | 11/2003 | Link |
| 6,764,260 B1 | 7/2004 | Nebesnak et al. |
| 6,793,441 B2 | 9/2004 | Shimizu et al. |
| 6,898,917 B2 | 5/2005 | Durning et al. |
| 7,000,359 B2 | 2/2006 | Meyer |
| 7,179,761 B2 | 2/2007 | Malik et al. |
| 7,219,479 B2 | 5/2007 | Durning et al. |
| 7,488,523 B1 | 2/2009 | Muncaster et al. |
| 7,686,903 B2 | 3/2010 | Muncaster et al. |
| 7,797,906 B2 | 9/2010 | Kassem |
| 7,935,202 B2 | 5/2011 | Stanley |
| 7,968,171 B2 | 6/2011 | Seth et al. |
| 7,985,460 B2 | 7/2011 | Polk |
| 8,201,373 B2 | 6/2012 | Charles, Jr. |
| 8,291,668 B2 | 10/2012 | Iske et al. |
| 8,298,661 B2 | 10/2012 | Samanta et al. |
| 8,298,662 B2 | 10/2012 | Samanta et al. |
| 8,366,849 B2 | 2/2013 | Buchi et al. |
| 8,453,405 B2 | 6/2013 | Wiercisnki et al. |
| 8,454,773 B2 | 6/2013 | Cisneros |
| 8,475,909 B2 | 7/2013 | Seth et al. |
| 8,499,524 B2 | 8/2013 | Stanley |
| 8,524,029 B2 | 9/2013 | Stanley |
| 8,557,070 B2 | 10/2013 | Stanley |
| 8,608,883 B2 | 12/2013 | Blasdel et al. |
| 8,608,884 B2 | 12/2013 | Stanley |
| 8,609,213 B2 | 12/2013 | Wiercinski et al. |
| 8,623,158 B2 | 1/2014 | Stanley |
| 8,635,833 B2 | 1/2014 | Anderson |
| 8,713,879 B2 | 5/2014 | Wiercinski et al. |
| 2003/0070391 A1 | 4/2003 | Tachauer et al. |
| 2003/0163971 A1 | 9/2003 | Chen |
| 2010/0167047 A1 | 7/2010 | Ise et al. |
| 2012/0180933 A1 | 7/2012 | Wiercinski et al. |
| 2012/0198787 A1 | 8/2012 | Mo et al. |
| 2013/0037989 A1 | 2/2013 | Wiercinski et al. |
| 2013/0104495 A1 | 5/2013 | Wiercinski et al. |
| 2013/0115464 A1 | 5/2013 | Higashi et al. |
| 2013/0302557 A1 | 11/2013 | Cisneros |
| 2013/0337162 A1 | 12/2013 | Wiercinski et al. |
| 2014/0286726 A1 | 9/2014 | Meese |

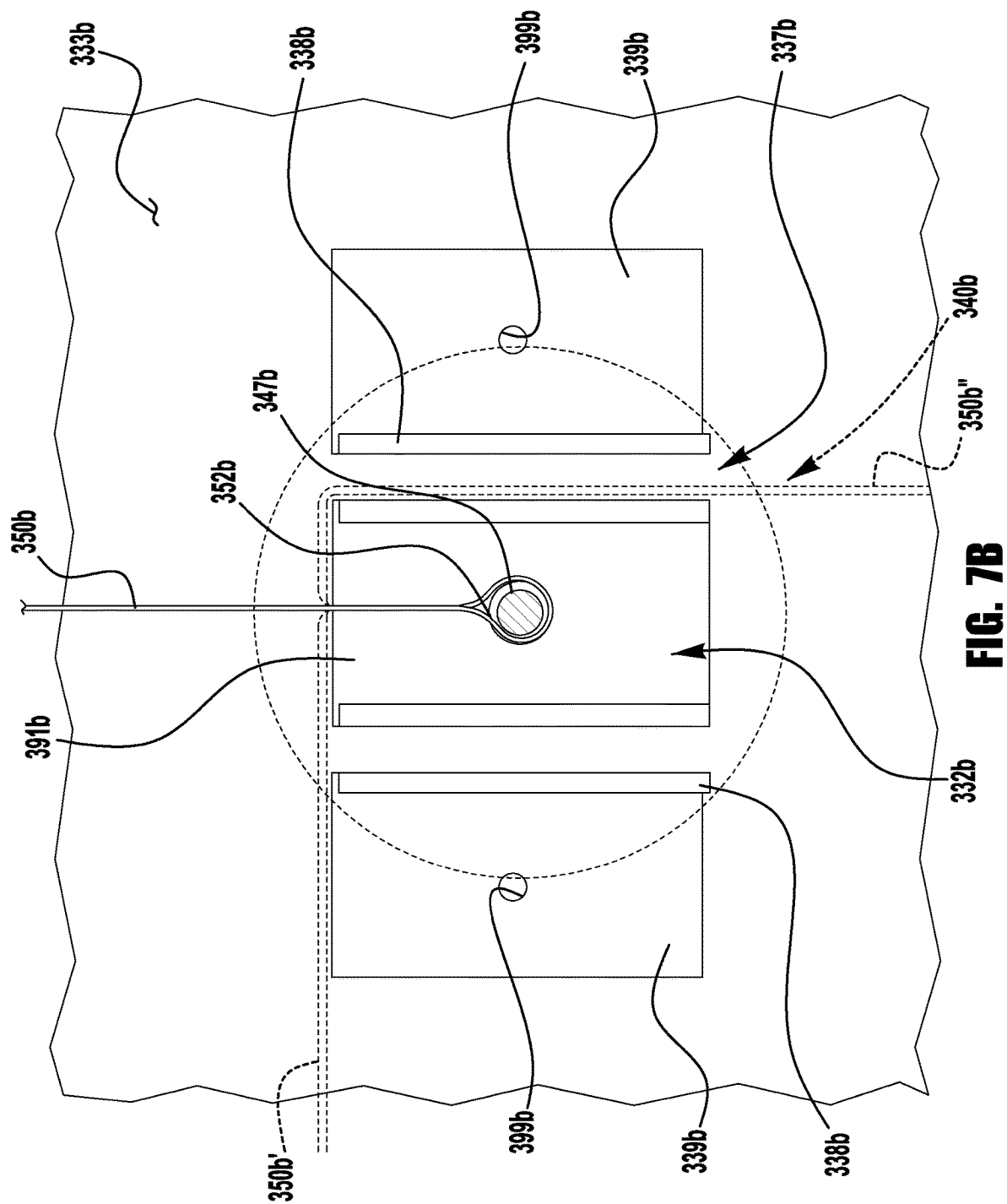

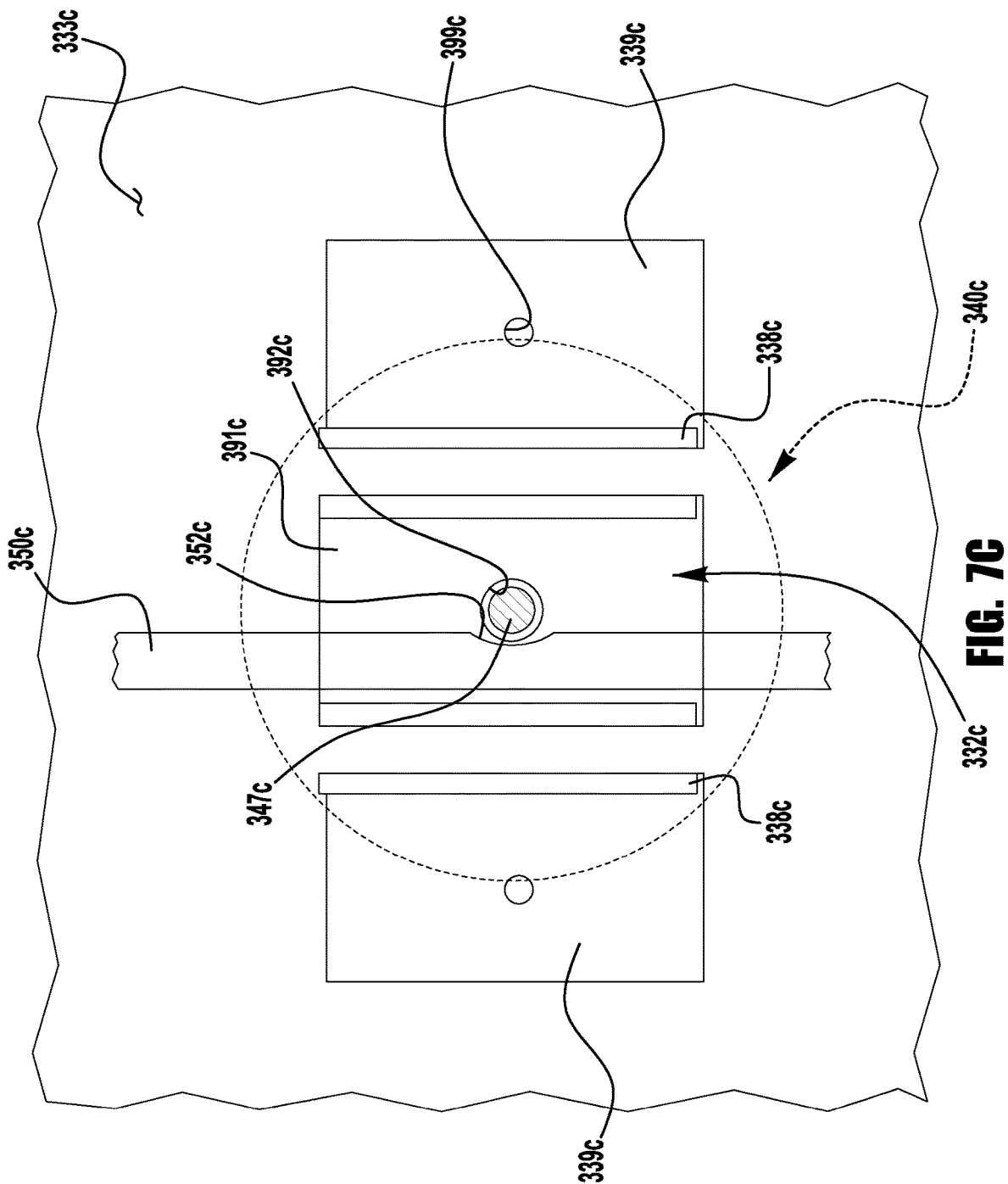

MECHANICALLY DETACHABLE MEMBRANE FOR PRE-APPLIED WATERPROOFING

RELATED APPLICATION

This application claims priority to U.S. Provisional Application Ser. No. 62/140,528, filed on Mar. 31, 2015, titled MECHANICALLY DETACHABLE MEMBRANE FOR PRE-APPLIED WATERPROOFING, the entire disclosure of which is incorporated by reference herein.

BACKGROUND

Below ground waterproofing of concrete foundation walls in large cities or other locations in which excavation around the foundation is impractical or impossible presents the challenge of securely fastening a waterproofing membrane to the exterior surface of the newly poured concrete walls with little or no access to the exterior of the foundation after the concrete is poured. A conventional waterproofing technique in such situations, known as blindside or pre-applied waterproofing, involves the fastening (e.g., by nails, staples, etc.) of one or more sheets of waterproofing membrane to a lagging wall or other retaining structure exterior to the intended location of the concrete wall. Concrete is then poured directly against a surface of the waterproofing membrane, such that when the concrete wall is cured, the waterproofing membrane is secured between the exterior surface of the concrete wall and the interior surface of the lagging wall (e.g., by an adhesive, such as a butyl adhesive, or any other suitable mechanical or chemical attachment).

Over time, shifting, settlement, decay, or other movement of the lagging wall with respect to the concrete wall can cause tears in the waterproofing membrane (particularly at locations where the membrane is fastened to the lagging wall) or split seams between adjacent sheets of the waterproofing membrane. Because the exterior surfaces of the completed concrete foundation walls are generally inaccessible, this damage to the waterproofing membrane is not readily repairable.

SUMMARY

The present application contemplates pre-applied membrane attachment systems, for example, for blindside concrete wall waterproofing, by which a membrane is mechanically attached to a lagging wall or other retaining structure prior to pouring a concrete wall against the membrane. Once the concrete wall has cured and attached to the membrane, the membrane attachment system is configured to mechanically detach the membrane from the retaining structure, such that movement of the retaining structure with respect to the cured concrete wall does not tear, split, or otherwise disrupt the membrane attached to the cured concrete wall.

According to an exemplary embodiment of the present application, a method of attaching a membrane to a composite structure is contemplated. In the exemplary method, a base portion of a fastener is affixed to a membrane such that a body portion of the fastener extends from a rear surface of the membrane. The body portion of the fastener is assembled with a retaining structure to secure the rear surface of the membrane against an exterior surface of the retaining structure. A curable composite is deposited against a front surface of the membrane, with the curable composite curing to form a composite structure attached to the front surface of the membrane. A detachment mechanism is operated to separate the body portion of the fastener from the base portion of the fastener, thereby detaching the membrane from the retaining structure.

According to another exemplary embodiment, a membrane attachment system includes a retaining structure, a membrane, a fastener and a detachment mechanism. The retaining structure has an exterior surface and a cavity recessed from the exterior surface, the cavity being partially defined by a barrier wall portion defining at least a portion of the exterior surface. The fastener includes a base portion affixed to the membrane and a body portion extending through an aperture in the barrier wall portion and into the cavity to secure a rear surface of the membrane against the exterior surface of the retaining structure. The detachment mechanism is operable to separate the body portion of the fastener from the base portion of the fastener, thereby detaching the membrane from the retaining structure.

According to still another exemplary embodiment, a method of attaching a membrane to a composite structure is contemplated. In the exemplary method, a retaining structure is provided, having an exterior surface and a cavity recessed from the exterior surface, the cavity being partially defined by a barrier wall defining at least a portion of the exterior surface. A base portion of a fastener is affixed to a membrane such that a body portion of the fastener extends from a rear surface of the membrane. The fastener body portion is installed through an aperture in the barrier wall portion and into the cavity to secure the rear surface of the membrane against the exterior surface of the retaining structure. A curable composite is deposited against a front surface of the membrane, the curable composite curing to form a composite structure attached to the front surface of the membrane. A detachment mechanism is operated in the cavity to break the frangible portion, thereby detaching the membrane from the retaining structure.

According to yet another embodiment, a waterproofed concrete wall supported by an exterior retaining structure includes a concrete wall structure and a waterproofing membrane having a front surface attached to an outer surface of the concrete wall structure. A plate member is attached to a rear surface of the waterproofing membrane. A bolt is assembled with the plate member, with a head portion captured between the waterproofing membrane and the plate member, and a shaft portion installed through an aperture in the plate member to extend rearward of the rear surface of the waterproofing membrane for attachment to an exterior retaining structure. The shaft portion is frangible to detach the waterproofing membrane from the exterior retaining structure after the concrete wall has cured.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to provide examples of the principles of this invention.

FIG. 7B is a cross-sectional front view of the membrane attachment system of FIG. 5, shown with yet another exemplary detachment tool;

FIG. 7C is a cross-sectional front view of the membrane attachment system of FIG. 5, shown with still another alternative detachment tool;

DETAILED DESCRIPTION

Figure 1:
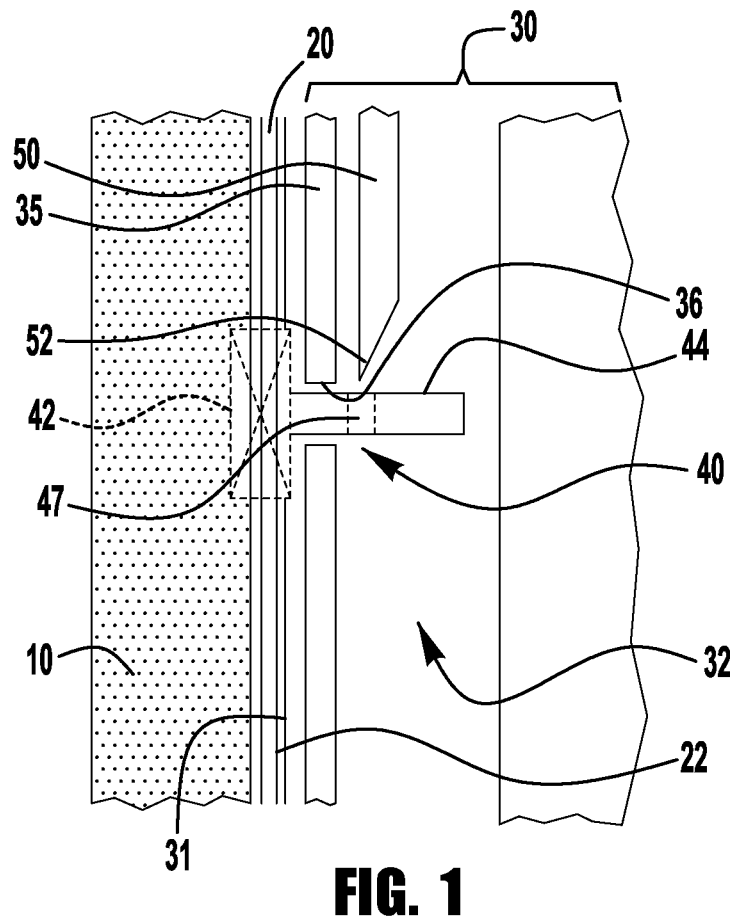
FIG. 1 is a cross-sectional side schematic view of an exemplary embodiment membrane supported by a retaining structure.

As described herein, when one or more components are described as being assembled, connected, joined, affixed, coupled, attached, or otherwise interconnected, such interconnection may be direct as between the components or may be indirect such as through the use of one or more intermediary components. Also as described herein, reference to a "member," "component," or "portion" shall not be limited to a single structural member, component, or element but can include an assembly of components, members or elements.

The Detailed Description merely describes exemplary embodiments and is not intended to limit the scope of the claims in any way. Indeed, the invention as claimed and described is broader than and unlimited by the exemplary embodiments, and the terms used in the claims have their full ordinary meaning. For example, while the specific embodiments described herein relate to systems and methods for the blindside application of a waterproofing membrane to a concrete wall, the inventive systems and methods described herein may additionally or alternatively be applied to other types of concrete structures, structures formed from other materials (including other curable composites, such as cement, plaster, and geopolymers), and other types of membranes (e.g., thermal insulating membranes, fire retardant membranes, etc.).

The present application contemplates systems and methods for mechanically detaching a membrane from a lagging wall or other retaining structure upon the completion of the curing of a composite structure to which the membrane is to be attached, for example, to prevent tears, splits, or other discontinuities caused by movement of the retaining structure with respect to the composite structure. In an exemplary embodiment, a retaining structure may be provided with a cavity that receives at least a portion of one or more fasteners attaching the membrane to the retaining structure. A detachment mechanism is operable in the channel to separate the portion of the one or more fasteners from the membrane to separate the membrane from the retaining structure.

Many different fastening arrangements may be utilized to detachably secure fasteners affixed to a membrane with a cavity defining portion of a retaining structure. As used herein, the term "fastener" may include any one or more components or materials that effect an attachment, including, for example, bolts, screws, staples, pins, clips, magnetic couplings, and adhesives. In an exemplary embodiment, a fastener includes a base portion affixed to (e.g., installed through, clamped to, or otherwise attached to) the membrane, and a body portion extending into a cavity in the retaining structure through an aperture in a barrier wall portion of the retaining structure. While the fastener body portion may extend across the entire depth of the cavity (e.g., for anchoring into a recessed or rear portion of the retaining structure), in other embodiments, the fastener body portion may extend only partially into the cavity (e.g., a sufficient amount to secure the membrane against sliding movement with respect to the retaining structure). To detach the membrane from the retaining structure, the fastener body portion may be separated from the fastener base portion by a detachment mechanism that is operable within the channel to separate the fastener body portion from the fastener base portion.

Many different types of detachment mechanisms may be utilized, including, for example, one or more tools operable to separate the fastener base portion from the fastener body portion. Examples include cutting tools, clipping tools, twisting tools, and impacting tool. A detachment tool structure may include a bar, rod, wire, cable, or other such structures insertable into the cavity for engagement with the body portion of the fastener. Other types of detachment mechanisms may function to separate the fastener body portion from the base portion without direct engagement of a tool with the fastener body portion. For example, a detachment mechanism may include a magnet positioned to magnetically attract a magnetized fastener body portion away from the base portion, a heating element effective to melt a portion of the fastener body portion, a solvent effective to dissolve a portion of the fastener body portion, or a pressurized fluid effective to break a frangible portion of the fastener body portion.

Many different types of separable fastener arrangements may be utilized, including, for example, clamped, adhesive bonded, threaded, or interlocking (e.g., VELCRO®) engagement of the fastener base portion with the fastener body portion. In an exemplary embodiment, a body portion of a fastener is formed from a bolt or pin including a frangible portion that may be broken (directly or indirectly) by a detachment tool or other such detachment mechanism that is operable within the retaining structure cavity, thereby separating the membrane and fastener base portion from the retaining structure and fastener body portion. The frangible portion may include, for example, a frangible material (e.g., plastic), a perforated or necked down portion of the fastener body portion, or a connection between the body portion and the base portion (e.g., an adhesive connection, interlocking connection, or snap-fit connection). The detachment tool may be positioned to directly impact the frangible portion of the fastener, or alternatively, the detachment tool may apply a force to another portion of the fastener, sufficient to break the frangible portion of the fastener (e.g., by applying a bending or torsion force to the frangible portion).

FIG. 1 schematically illustrates a side cross-sectional view of a membrane 20 secured to a retaining structure 30 by a fastener 40 having a base portion 42 affixed to the membrane 20 and a body portion 44 installed through an aperture 36 in a barrier wall 35 and into a channel or other such cavity 32 in the retaining structure 30, to secure a rear surface 22 of the membrane 20 against an exterior surface 31 of the retaining structure 30. A detachment tool 50 is receivable in the channel 32, and includes a fastener engaging portion 52 (e.g., an edge portion) positioned to engage the fastener body portion 44. When a force is applied to the detachment tool 50, the e fastener engaging portion 52 directly or indirectly breaks the frangible portion 47 to separate the fastener body portion 44 from the fastener base portion 42, thereby allowing the retaining structure 30 to move with respect to the membrane 20 and fastener base portion 42 (e.g., as a result of seismic shifts, foundation settlement, decay or erosion of the retaining structure, etc.).

Many different arrangements may be used to affix a base portion of a detachable fastener with a membrane, including, for example, fasteners driven through the membrane or installed through holes in the membrane. In other embodiments a fastener base portion is affixed to a membrane without requiring holes (either preformed or by piercing or puncturing) in the membrane (e.g., to reduce susceptibility to tearing), for example, by clamping the membrane onto the fastener from the other side of the membrane. In still other embodiments, a base portion of the fastener may be attached to the rear surface of the membrane, such that no portion of the fastening arrangement is disposed on the front side of the membrane (e.g., to facilitate uniform and continuous adhesion of the membrane to the composite structure. In one such embodiment, a base portion of a fastener includes a plate member attached to the rear surface of the membrane, with a fastener body portion extending rearward from the base portion. The body portion may be integral with the base portion, or may be assembled with the base portion. In an exemplary embodiment, the membrane adhering surface of the plate member includes a recessed portion in which the head of a bolt is seated, with the shaft of the bolt extending through a hole in the plate member to define the fastener body portion.

Figure 2A:
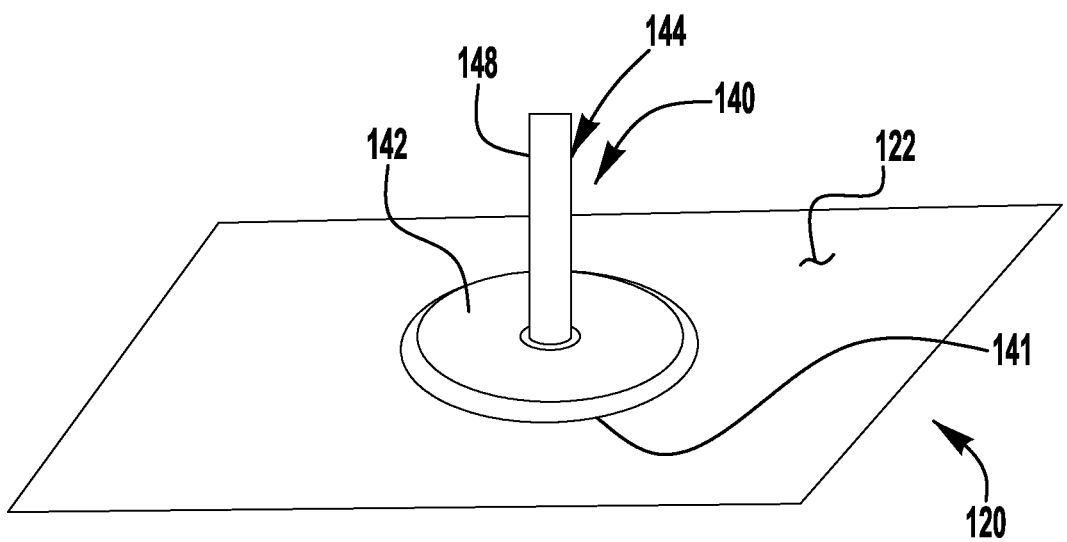
FIG. 2A is a perspective view of an exemplary fastener attached to a rear surface of an exemplary membrane.
Figure 2B:
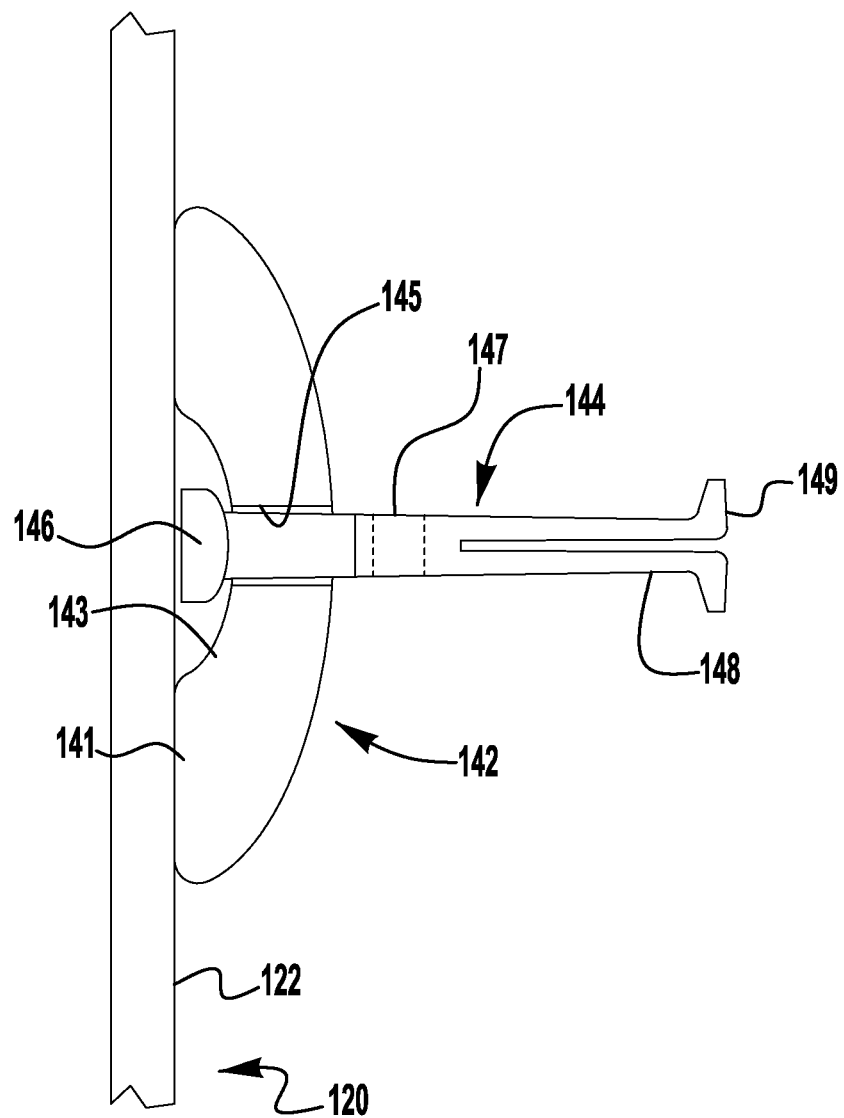
FIG. 2B is a cross-sectional side view of the fastener and membrane arrangement of FIG. 2A.

FIGS. 2A and 2B illustrate perspective and cross-sectional views of an exemplary fastener 140 attached to a rear surface 122 of a membrane 120. The fastener 140 includes a plate member 142 having an adhering surface 141 attached to the membrane rear surface 122, and a bolt 144 having a head portion 146 seated in a recessed portion 143 of the plate member 142, and captured between the membrane 120 and the plate member 142. A shaft portion 148 of the bolt 144 extends through a hole 145 in the plate member 142, to extend rearward of the plate member. The bolt shaft 148 may, but need not, include a flanged, pronged, or otherwise enlarged end 149 sized to impede withdrawal of the bolt shaft 148 from a bolt receiving aperture (e.g., aperture in the membrane retaining structure). The bolt shaft 148 may also include a necked down, perforated, or otherwise frangible portion 147 configured to permit separation of the fastener body portion (bolt shaft 148) from the fastener base portion (bolt head 146 and plate member 142) when the fastener is impacted by a detachment tool. Alternatively, the entire bolt shaft may be constructed from a frangible material (e.g., brittle plastic) to form an elongated frangible portion of the fastener. In still another exemplary embodiment, a detachable connection (e.g. snap-fit connection) between the body portion and the base portion may provide a frangible portion of the fastener. While the detachment tool may impact the frangible portion of the fastener directly, in other embodiments, a force applied to another location of the fastener may cause the fastener to break or separate at the frangible portion.

The adhering surface 141 of the plate member 142 may be affixed to the membrane using a variety of arrangements, including, for example, glue, adhesive substrates (e.g., double sided tape), chemical bonding, and welding. In an exemplary embodiment, a plate member (or induction plate) includes a conductive material (e.g., steel, aluminum or any other suitable metal) and a thermoplastic adhering surface or coating (e.g., vinyl, acrylic, latex, butyl) that may be induction welded to the membrane using an induction welding machine. This arrangement forms a secure seal between the membrane 120 and the induction plate 142 without weakening (e.g., penetrating, perforating, or deforming) the membrane. Many different membrane materials may be utilized including, for example, thermoset or thermoplastic materials including one or more of high density polyethylene (HDPE), low density polyethylene (LDPE), butyl thermoplastic olefin (TPO), polyvinyl chloride (PVC), polyolefin, polyurethane, ethylene interpolymer alloy/ketone ethylene ester (EIA/KEE), styrene-butadiene rubber (SBR), ethylene propylene diene monomer (EPDM), and neoprene.

Figure 3:
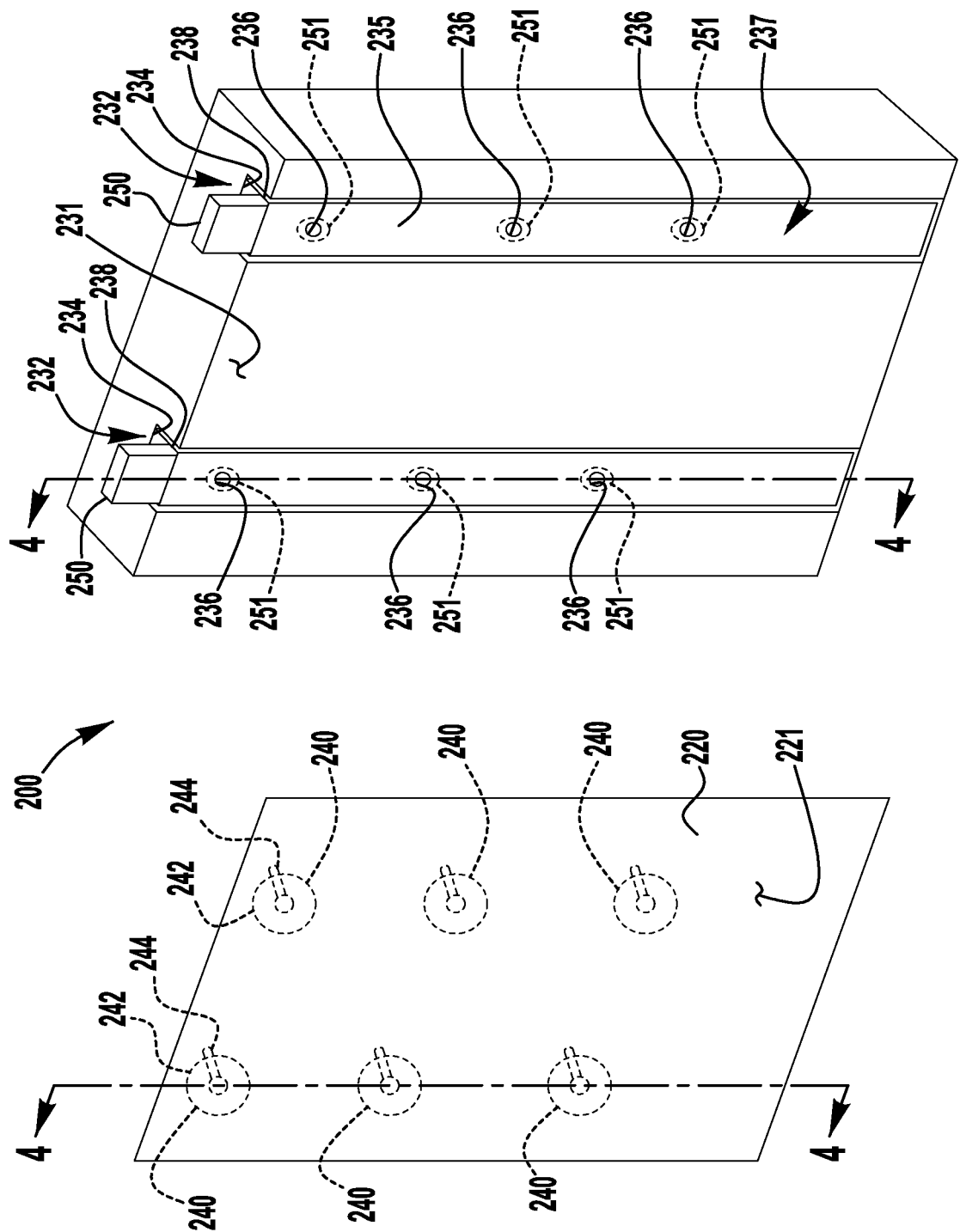
FIG. 3 is a perspective views of an exemplary membrane attachment system including a retaining structure supporting a membrane to be attached to a composite structure.
Figure 4:
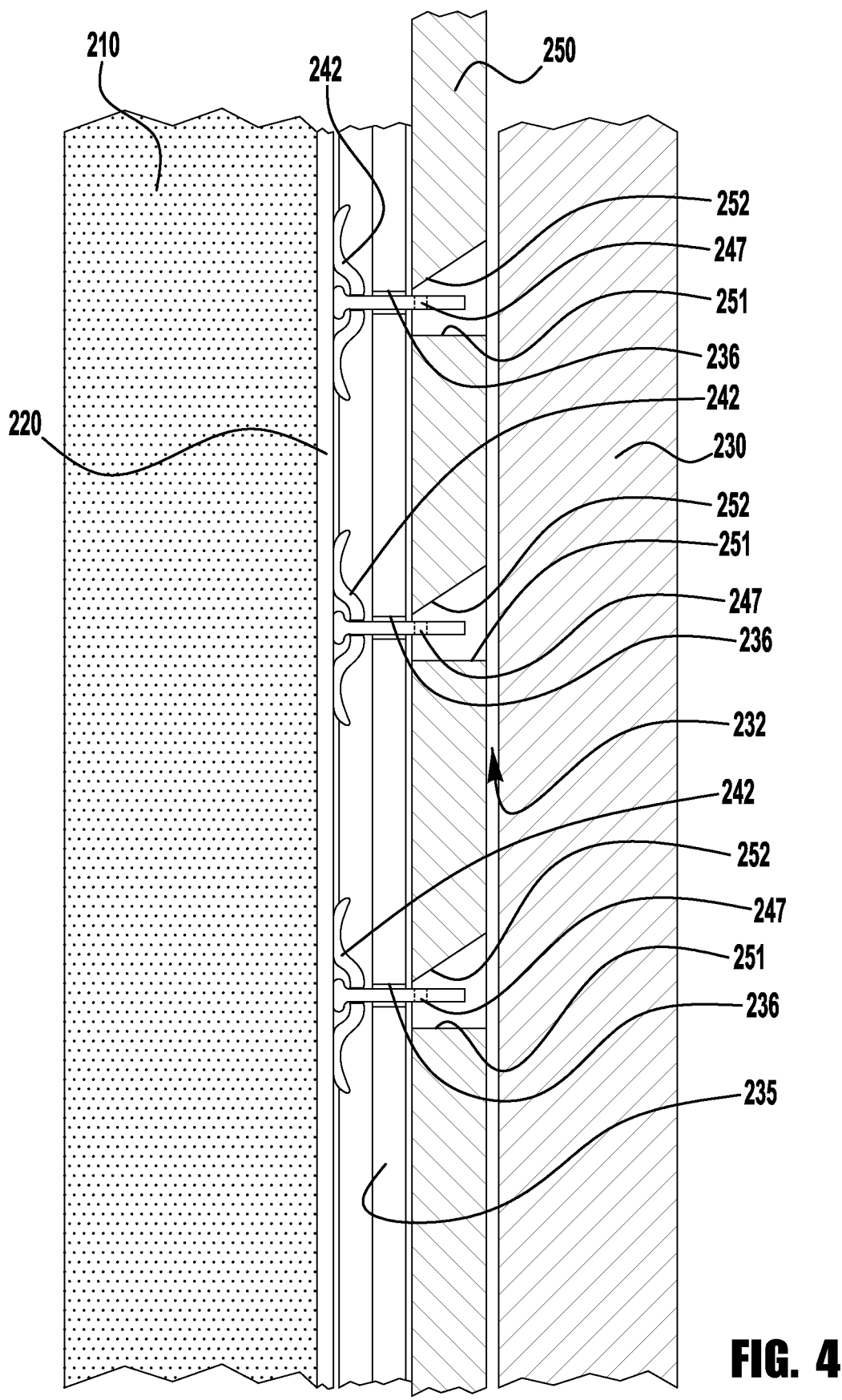
FIG. 4 is a cross-sectional side view of the membrane attachment system of FIG. 3.

To provide uniform support and retention for a membrane to be attached to a composite structure (e.g., a concrete foundation wall) to be cured or otherwise formed against the membrane, an array of detachable fasteners may be affixed to the membrane for installation in one or more cavities of a retaining structure (e.g., a lagging wall). FIGS. 3 and 4 show perspective and side cross-sectional views of an exemplary membrane attachment system 200 including a retaining structure 230 supporting a membrane 220 (e.g., the exemplary membrane and fastener arrangement of FIGS. 2A and 2B) to be attached to a composite structure 210 (e.g., a concrete foundation wall) that is cured or otherwise formed against the membrane and retaining structure. The exemplary retaining structure 230 of FIGS. 3 and 4 includes one or more trenches 234 recessed from an exterior surface 231 to partially define channels or other such cavities 232. To isolate the channels (e.g., to prevent the composite structure and membrane from expanding into the channels), the channels 232 may be further defined by barrier walls 235 at least partially defining the exterior surface 231 of the retaining structure. As shown, the barrier walls 235 may (but need not) be slightly recessed from the exterior surface 231 to accommodate the base portions 242 of the fasteners, such that the membrane 220 is substantially planar. The barrier walls 235 include spaced apertures 236 (e.g., holes, slots, notches, etc.) positioned to receive the fastener body portions 244 therethrough, to extend into the channels 232. In the illustrated embodiment, the barrier walls 235 are defined by U-shaped rails 237 installed in the trenches 234. Leg portions 238 of the rails 237 may provide for a uniform depth of the channels 232, to provide sufficient space for a detachment tool received in the channel.

Figure 5:
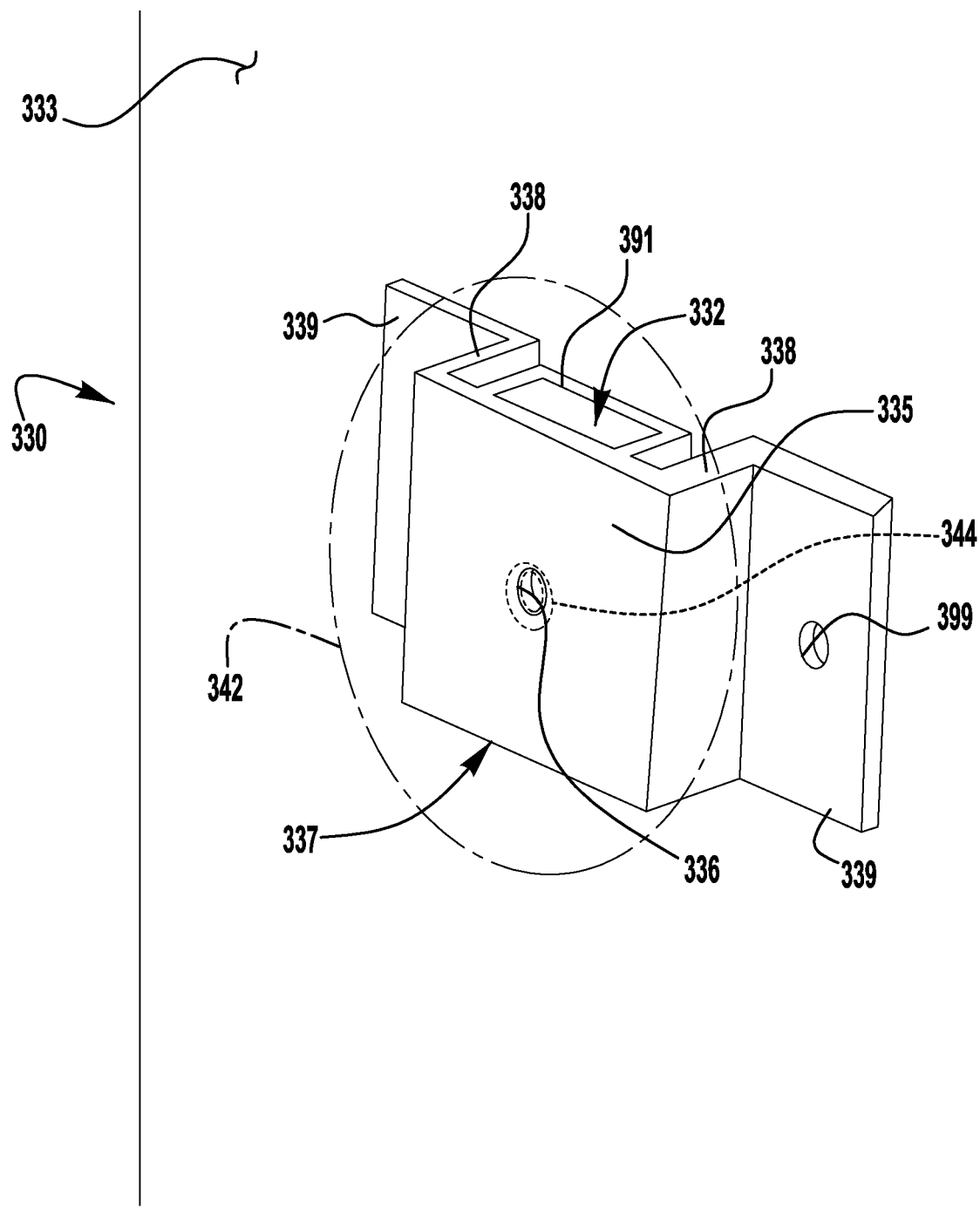
FIG. 5 is a front perspective views of another exemplary membrane attachment system including a retaining structure supporting a membrane to be attached to a composite structure.
Figure 6:
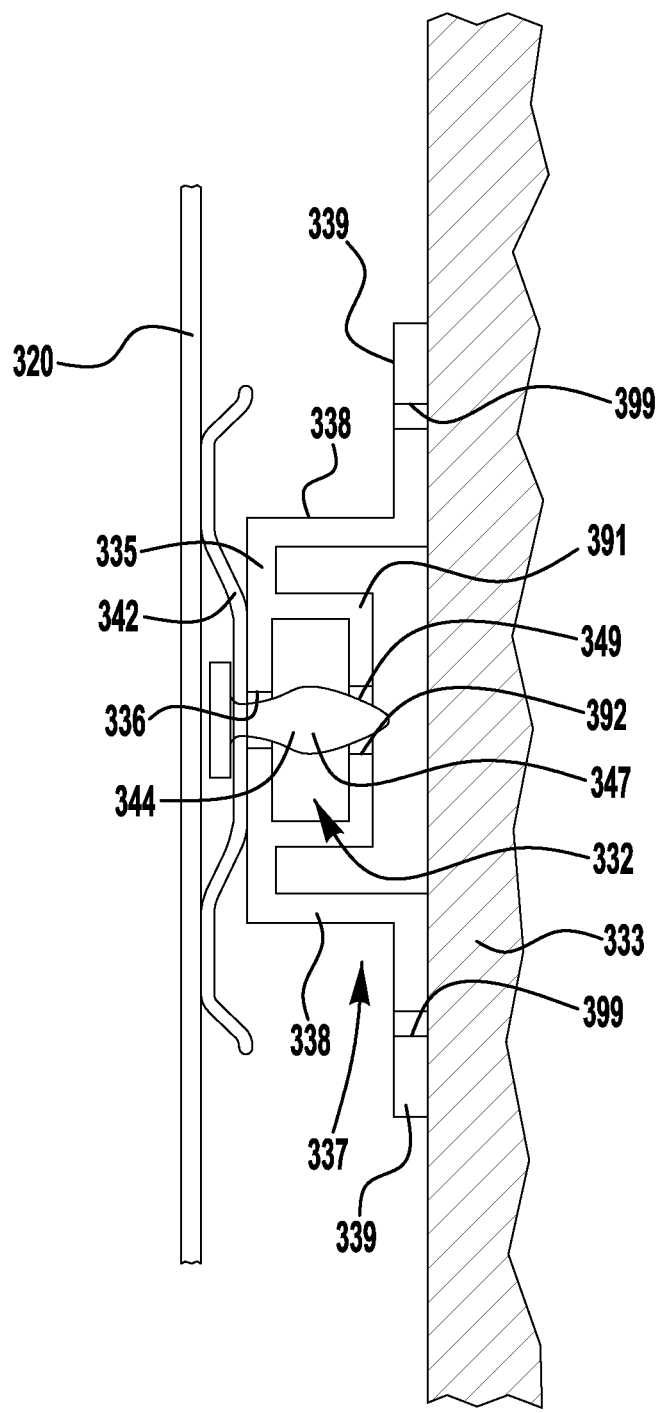
FIG. 6 is a cross-sectional top view of the membrane attachment system of FIG. 5.
Figure 7:
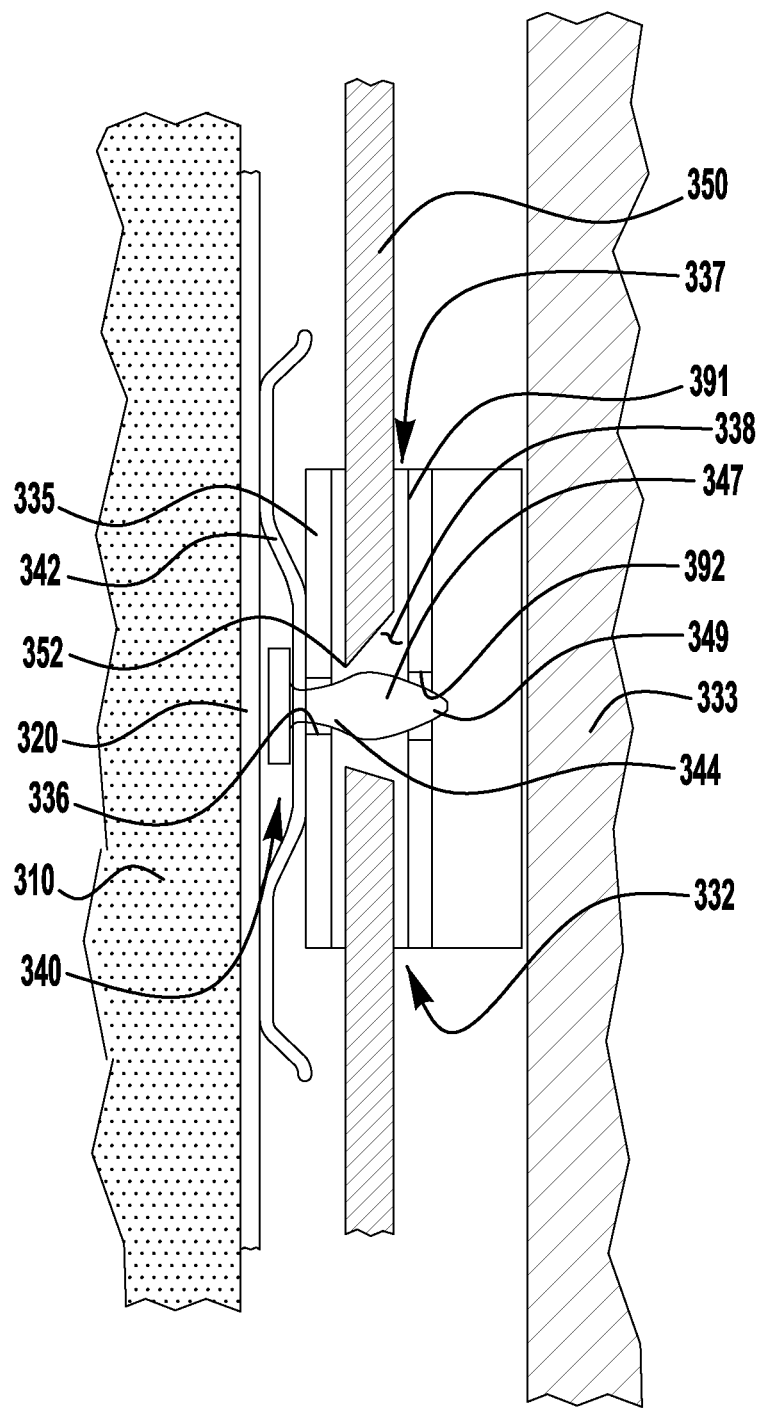
FIG. 7 is a cross-sectional side view of the membrane attachment system of FIG. 5, shown with an exemplary detachment tool.

In another exemplary embodiment, the barrier walls and cavities of the retaining structure may be defined by one or more brackets affixed (e.g., by screws, adhesives, or other such fasteners) to a front surface of the retaining structure (e.g., a front surface of a lagging wall). This arrangement may allow for easier adaptation of an existing lagging wall (or other retaining structure) for use with the membrane attachment systems of the present application. FIGS. 5-7 illustrate an exemplary retaining structure 330 including a wall portion 333 and one or more fastener receiving brackets 337 having base flange portions 339 secured to the wall portion 333 by screws (not shown) installed in mounting holes 399 in the flange portions. The exemplary bracket 337 includes leg portions 338 extending from the flange portions 339, and a barrier wall 335 spanning the leg portions and defining one or more apertures 336 for receiving a fastener body portion 344. In the exemplary embodiment, a track portion 391 extends rearward from the barrier wall 335 to define a cavity or channel 332 into which the fastener body portion extends. As shown in FIG. 6, the track portion 391 may be provided with a rear aperture 392 for receiving an end portion 349 of the fastener body portion 344 to substantially fix the end portion, for example, to facilitate alignment of the fastener, or to facilitate breakage of the fastener body portion (e.g., by limiting bending deformation). In other embodiments, the track portion may be eliminated, such that the bracket leg portions and wall portion front surface partially define the cavity.

While the illustrated example shows a relatively short bracket 337 defining a short channel 332 and a single aperture 336 for assembly of one fastener, in other embodiments, the bracket may extend over a substantial length of the wall portion and include several fastener receiving apertures. In some applications, a series of aligned brackets may be attached to the wall portion to form a single elongated channel. In other embodiments, a parallel series of aligned brackets may be attached to the wall portion to form a second elongated channel parallel to the first channel. For applications in which curable composite foundation walls are being waterproofed two or more floors beneath ground level, these channels may extend 20 to 100 feet or even further to accommodate fasteners secured to two or more underground floors of waterproofing.

While many different types of detachment tools may be utilized, in the illustrated embodiments of FIGS. 4 and 7, the detachment tool 250, 350 is formed from a bar having a cross-sectional shape (e.g., rectangular) that corresponds (e.g., in size and/or shape) to the cross-sectional shape of the channel 232, 332, to facilitate proper positioning of the tool 250, 350 within the channel. The exemplary tool 250, 350 includes apertures 251, 351 sized and positioned to align with the barrier wall apertures 236, 336, such that the installed fastener body portions 244, 344 extend through the tool apertures 251, 351.

To detach the membrane 220, 320 from the retaining structure 230, 330 (e.g., after the concrete wall or other composite structure 210, 310 has been formed and attached to the front surface 221, 321 of the membrane 220, 320), the detachment tool 250, 350 is moved within the channel 232, 332 such that an edge portion 252, 352 of each tool aperture 251, 351 engages and breaks a frangible portion 247, 347 of the fastener body portion 244, 344 (or otherwise separates the fastener body portion from the fastener base portion 242, 342). The tool aperture edge portions 252, 352 may be chamfered or sharpened to facilitate breaking of the fastener body portions 244, 344 when a force is applied to the tool 250, 350.

The tool 250, 350 of FIGS. 4 and 7 may be moved in the channel using many different techniques, including, for example, by being hand forced (e.g., pushed, pulled, slid or pivoted), impacted by a hammer or other such tool, or pulled by a cable attached to the tool. After the tool 250, 350 has been operated to separate the fastener body portion 244, 344 from the fastener base portion 242, 342 (thereby separating the membrane 220, 320 from the retaining structure 230, 330), the tool may be removed from the channel (e.g., for use in another detachable membrane arrangement). In other embodiments, the tool 250, 350 may be allowed to remain in the channel 232, 332. In such an arrangement, a visual indication of whether the tool has been used to break the fasteners may be provided. For example, the tool may be configured to partially extend from an open end of the channel prior to use, with the tool being fully received in the channel after use.

In the illustrated embodiments of FIGS. 4 and 7, the detachment tool 250, 350 is moved longitudinally (e.g., either pushed or pulled) within the channel 232, 332, in the direction of the channel length, in a vertical direction. In other embodiments (not shown), the channel may extend horizontally, with the detachment tool moved longitudinally within the channel in the direction of the channel length, in a horizontal direction. In still other embodiments, the channel may be oriented at some angle between vertical and horizontal orientations.

Figure 7A:
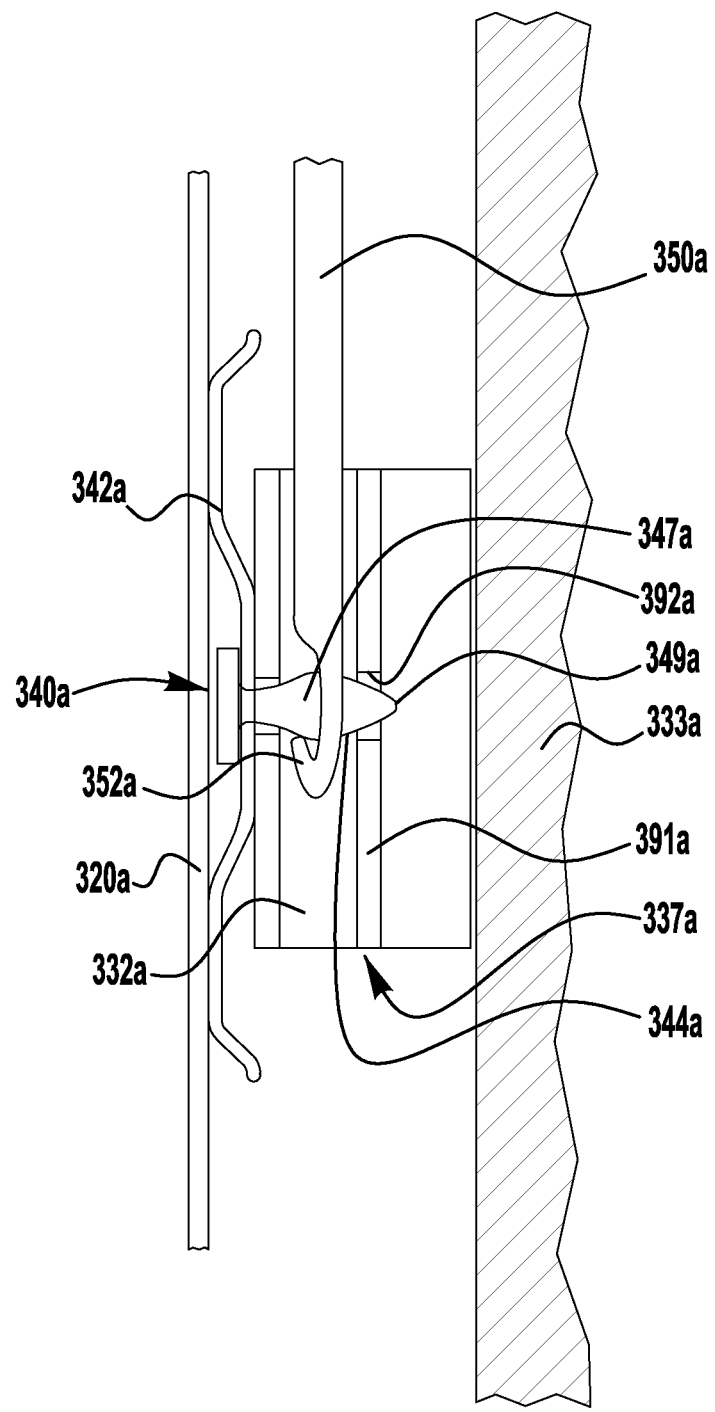
FIG. 7A is a cross-sectional side view of the membrane attachment system of FIG. 5, shown with another exemplary detachment tool.

Other types of longitudinally operable detachment tools may additionally or alternatively be used. For example, as shown in FIG. 7A, a hook type tool 350a may be inserted in the channel 332a and pulled to break the frangible portion 347a of the fastener 340a. As another example, as shown in FIG. 7B, a wire tool 350b may be received in the channel 332b and pulled to pulled to break the frangible portion 347b of the fastener 340b. The wire tool 350b may include an aperture defining loop portion 352b that encircles the frangible portion 347b of the fastener 340b, to apply a cutting force to the frangible portion when the wire is pulled. Additionally or alternatively, a portion of the wire outside the channel may be pulled in a direction different from the resulting pulled direction of the loop portion (or other such detaching portion) of the wire tool. For example, the external end of the wire tool 350b' may be pulled in a direction angled with respect to the orientation of the channel (e.g., vertically for a horizontal channel or horizontally for a vertical channel). As another example, the external end of the wire tool 350b" may be pulled in an opposite direction with respect to the pulled direction of the detaching portion.

Figure 7D:
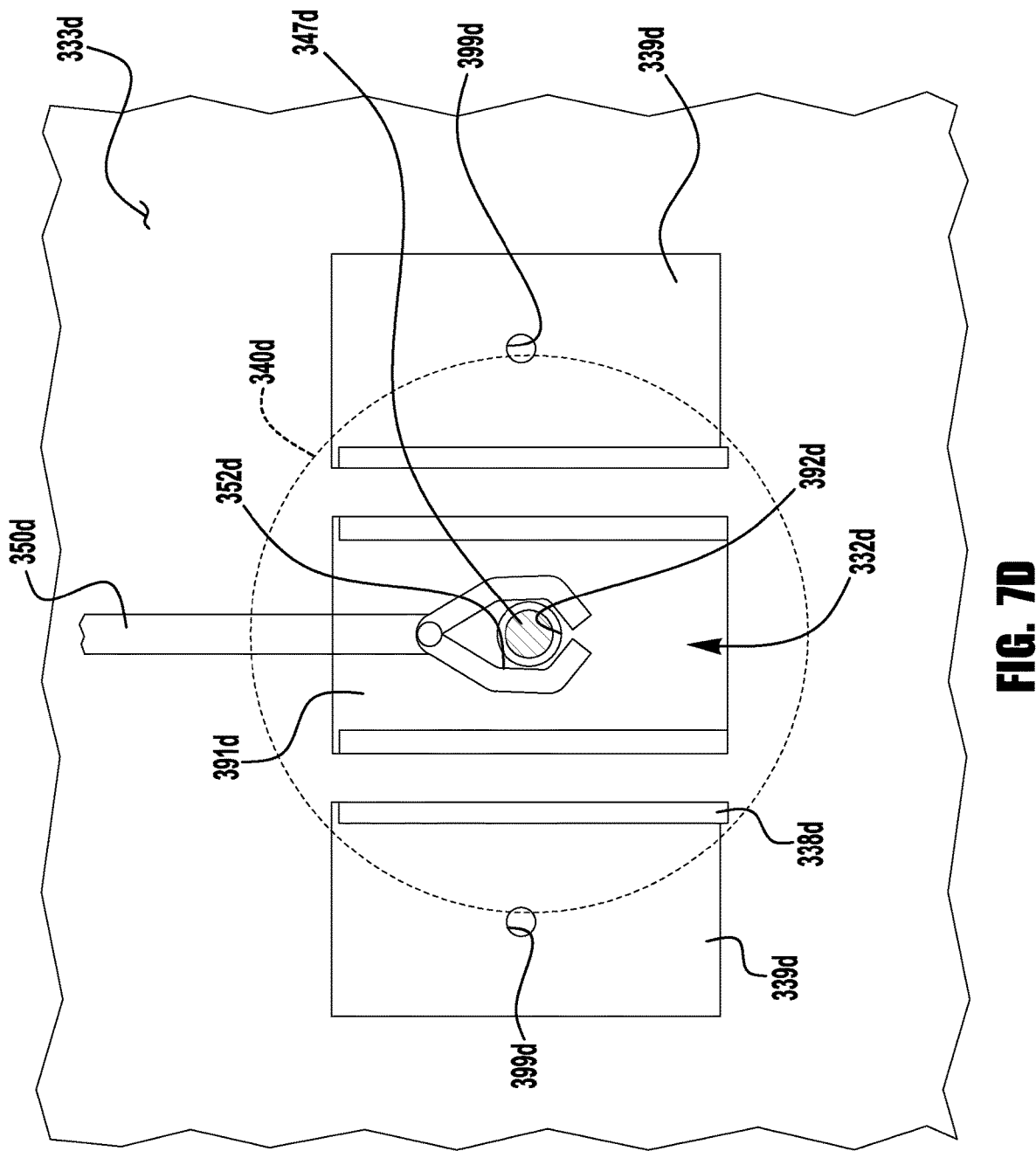
FIG. 7D is a cross-sectional front view of the membrane attachment system of FIG. 5, shown with another alternative detachment tool.

In other embodiments, a tool may be arranged to allow for lateral movement of the tool (in the direction of the channel width) to break or otherwise separate the fastener body portions from the fastener base portions, with the channel being disposed in any suitable orientation as described above. In one example, as shown in FIG. 7C, a rigid bar or blade tool 350c may be slid or pivoted laterally within the channel 332c to break the frangible portion 347c of the fastener 340c. As another example, as shown in FIG. 7D, a clipping or cutting tool 350d may be inserted in the channel 332d and actuated to laterally engage and clip the frangible portion 347d of the fastener 340d.

Figure 7E:
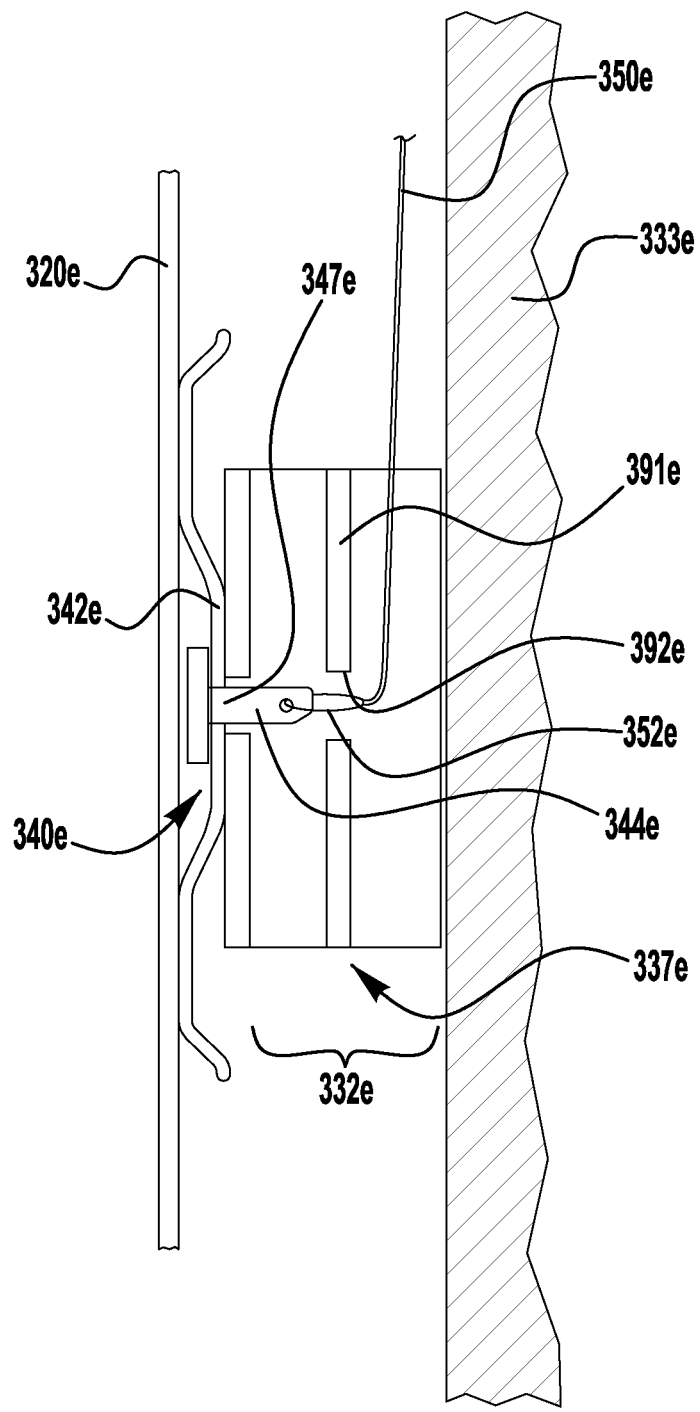
FIG. 7E is a cross-sectional side view of the membrane attachment system of FIG. 5, shown with another exemplary detachment tool.

In still other embodiments, the channel and tool may be arranged to allow for forward or rearward movement of the tool (in the direction of the channel depth) to break or otherwise separate the fastener body portions from the fastener base portions. As one example, as shown in FIG. 7E, an end portion 352e of a wire tool 350e may be pulled rearward to disconnect a body portion 344e from a base portion 342e at a frangible connection 347e (e.g., a snap-fit connection). In such an embodiment, the space between the front surface of the wall portion 333e and the track 392e may function as a second portion of the cavity 332e through which the wire 350e may be pulled, with the wire extending through the rear aperture 392e to direct the wire in a forward direction. In an exemplary embodiment, the end portion 352e (e.g., a loop) may be configured to retain the detached body portion 344e, for example, to provide the tool operator with a verification that the membrane 310e was successfully detached from the retaining structure 320e.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, hardware, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

While the present invention has been illustrated by the description of embodiments thereof, and while the embodiments have been described in considerable detail, it is not the intention of the applicant to restrict or in any way limit the scope of the invention to such detail. Additional advantages and modifications will readily appear to those skilled in the art. For example, the specific locations of the component connections and interplacements can be modified. Therefore, the invention, in its broader aspects, is not limited to the specific details, the representative apparatus, and illustrative examples shown and described. Accordingly, departures can be made from such details without departing from the spirit or scope of the applicant's general inventive concept.

The invention claimed is:

1. A membrane attachment system comprising:
    a retaining structure having an exterior surface and a cavity recessed from the exterior surface, the cavity being partially defined by a barrier wall portion at least partially defining the exterior surface;
    a membrane having a front surface and a rear surface;
    a fastener having a base portion affixed to the membrane and a body portion extending through an aperture in the barrier wall portion and into the cavity to secure the rear surface of the membrane against the exterior surface of the retaining structure; and
    a detachment tool operable in the cavity to separate the body portion of the fastener from the base portion of the fastener, thereby detaching the membrane from the retaining structure;
    wherein the detachment tool includes a fastener engaging portion positioned to engage the fastener body portion, such that a force applied to the detachment tool causes a frangible portion of the fastener to break, thereby separating the body portion of the fastener from the base portion of the fastener.

2. The membrane attachment system of claim 1, wherein the fastener engaging portion is positioned to engage the frangible portion of the fastener.

3. The membrane attachment system of claim 1, wherein the fastener engaging portion comprises a wire.

4. The membrane attachment system of claim 1, wherein the fastener base portion is attached to the rear surface of the membrane, such that the fastener does not penetrate the membrane.

5. The membrane attachment system of claim 4, wherein the fastener base portion comprises an induction plate that is induction welded to the rear surface of the membrane.

6. The membrane attachment system of claim 1, where the fastener further comprises a bolt having a shaft portion installed through an aperture in the base portion, with the shaft portion defining the fastener body portion.

7. The membrane attachment system of claim 1, wherein the cavity comprises a channel extending to a peripheral opening, the peripheral opening being sized to receive the detachment tool therethrough.

8. The membrane attachment system of claim 7, wherein the detachment tool is movable in a longitudinal direction within the channel to separate the body portion of the fastener from the base portion of the fastener.

9. The membrane attachment system of claim 1, wherein the retaining structure includes a wall portion and a bracket secured to a front surface of the wall portion, the bracket including the barrier wall portion and at least partially defining the cavity.

10. A method of attaching a membrane to a composite structure, the method comprising:
    providing a retaining structure having an exterior surface and a cavity recessed from the exterior surface, the cavity being partially defined by a barrier wall portion at least partially defining the exterior surface;
    securing a base portion of a fastener to a membrane such that a body portion of the fastener extends from a rear surface of the membrane;
    installing the fastener body portion through an aperture in the barrier wall portion to secure the rear surface of the membrane against the exterior surface of the retaining structure;
    depositing a curable composite against a front surface of the membrane, the curable composite curing to form a composite structure attached to the front surface of the membrane; and
    operating a detachment tool to break a frangible portion of the fastener, thereby detaching the membrane from the retaining structure;
    wherein the detachment tool includes a fastener engaging portion positioned to engage the fastener body portion, such that a force applied to the detachment tool causes a frangible portion of the fastener to break, thereby separating the body portion of the fastener from the base portion of the fastener.

11. The method of claim 10, wherein securing the fastener to the membrane comprises attaching the base portion of the fastener to the rear surface of the membrane without penetrating the membrane.

12. The method of claim 10, wherein attaching the base portion of the fastener to the rear surface of the membrane comprises induction welding the base portion to the rear surface of the membrane.

13. The method of claim 10, wherein installing the fastener through the aperture in the barrier wall portion further comprises installing the fastener through an aperture in the detachment tool to secure the detachment tool within the cavity, wherein the fastener engaging portion of the detachment tool is defined by the detachment tool aperture.

14. The method of claim 13, wherein the detachment tool comprises a wire having a loop portion that defines the aperture.

15. The method of claim 10, further comprising attaching the front surface of the membrane to the composite structure by an adhesive disposed on the front surface of the membrane.

16. A method of attaching a membrane to a composite structure, the method comprising:
affixing a base portion of a fastener to a membrane such that a body portion of the fastener extends rearward from a rear surface of the membrane;
assembling the body portion of the fastener with a retaining structure to secure the rear surface of the membrane against an exterior surface of the retaining structure;
depositing a curable composite against a front surface of the membrane, the curable composite curing to form a composite structure attached to the front surface of the membrane; and
using a detachment tool to separate the body portion of the fastener from the base portion of the fastener, thereby detaching the membrane from the retaining structure;
wherein the detachment tool includes a fastener engaging portion positioned to engage the fastener body portion, such that a force applied to the detachment tool causes a frangible portion of the fastener to break, thereby separating the body portion of the fastener from the base portion of the fastener.

17. The method of claim 16, wherein affixing the fastener to the membrane comprises attaching the base portion of the fastener to the rear surface of the membrane without penetrating the membrane.

18. The method of claim 16, wherein attaching the base portion of the fastener to the rear surface of the membrane comprises induction welding the base portion to the rear surface of the membrane.

\* \* \* \* \*